United States Patent [15] 3,644,010
Murphy [45] Feb. 22, 1972

[54] TAPE CASSETTE DISPLAY FIXTURE

[72] Inventor: John F. Murphy, Allentown, Pa.
[73] Assignee: Hess's of Allentown, Inc., Allentown, Pa.
[22] Filed: Sept. 8, 1970
[21] Appl. No.: 69,640

[52] U.S. Cl. ....312/135, 211/58, 206/1.5, 312/234
[51] Int. Cl. ....A47f 3/10
[58] Field of Search ....211/58; 206/1.5; 312/118, 120, 312/125, 202, 135, 234, 252

[56] References Cited

UNITED STATES PATENTS 2,728,622 12/1955 Griswold....312/135

*Primary Examiner*—James C. Mitchell
*Attorney*—Seidel, Gonda & Goldhammer

[57] ABSTRACT

A tape cassette display fixture is disclosed wherein tape cassettes are displayed in a manner which minimizes the possibility of theft while exhibiting tape cassettes in an attractive manner, facilitating observation of both sides of the cassette by potential purchasers.

12 Claims, 8 Drawing Figures

INVENTOR
JOHN F. MURPHY
BY
Seidel, Gonda & Goldhammer
ATTORNEYS

INVENTOR
JOHN F. MURPHY
BY
Seidel, Gonda & Goldhammer
ATTORNEYS.

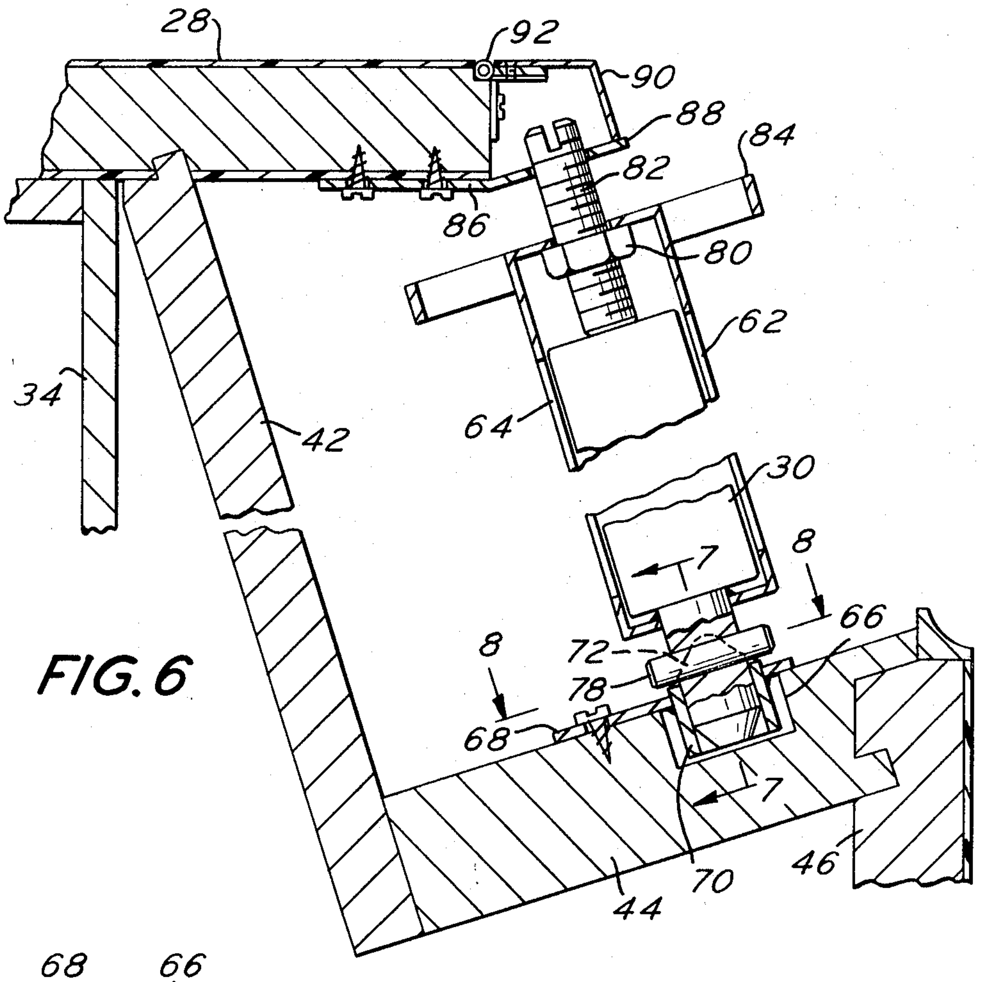
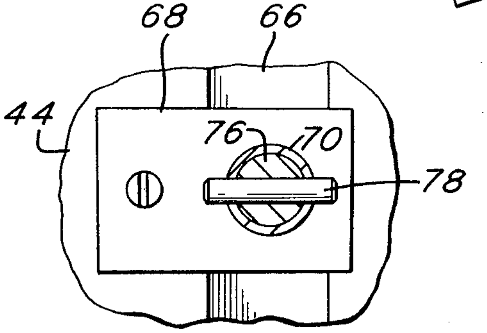
FIG. 8
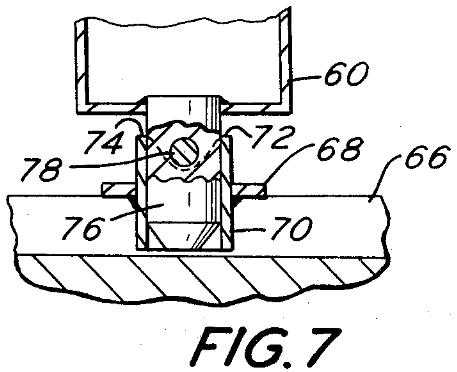
FIG. 7
INVENTOR
JOHN F. MURPHY
BY
Seidel, Gonda & Goldhammer
ATTORNEYS

TAPE CASSETTE DISPLAY FIXTURE

The present invention is directed to a tape cassette display fixture structurally interrelated in a manner whereby tape cassettes may be attractively displayed so that potential purchasers may observe both sides of the tape cassette. Due to the manner in which tape cassettes are manufactured and packaged, relevant information to be read by a potential purchaser appears on opposite side faces of the tape cassette.

The fixture of the present invention is constructed as set forth above while being structurally interrelated so that theft of the cassettes is minimized. The fixture attractively displays the cassettes so as to induce sales. The cassettes are exhibited in a manner so as to effectively utilize the available space, provide for ease of shopping, ease for facilitating the sale of a cassette, while utilizing a display fixture which permits classification of the tape cassettes by factors such as show, vocalist, rock group, etc.

It is an object of the present invention to provide a novel tape cassette display fixture.

It is another object of the present invention to provide a tape cassette display fixture which attractively displays tape cassettes while making effective use of available display space.

It is another object of the present invention to provide a tape cassette display fixture which minimizes pilferage and shoplifting.

It is another object of the present invention to provide a tape cassette display fixture which facilitates exhibition of tape cassettes by show, vocalist, art group, etc.

It is another object of the present invention to provide a tape cassette display fixture which is relatively simple, reliable, and inexpensive.

Other objects will appear hereinafter.

For the purpose of illustrating the invention, there is shown in the drawings a form which is presently preferred; it being understood, however, that this invention is not limited to the precise arrangements and instrumentalities shown.

FIG. 6 is an enlarged detail view of the structure embraced by the circles in FIG. 2.

FIG. 7 is a sectional view taken along the line 7—7 in FIG. 6.

FIG. 8 is a sectional view taken along the line 8—8 in FIG. 6.

Figure 1:
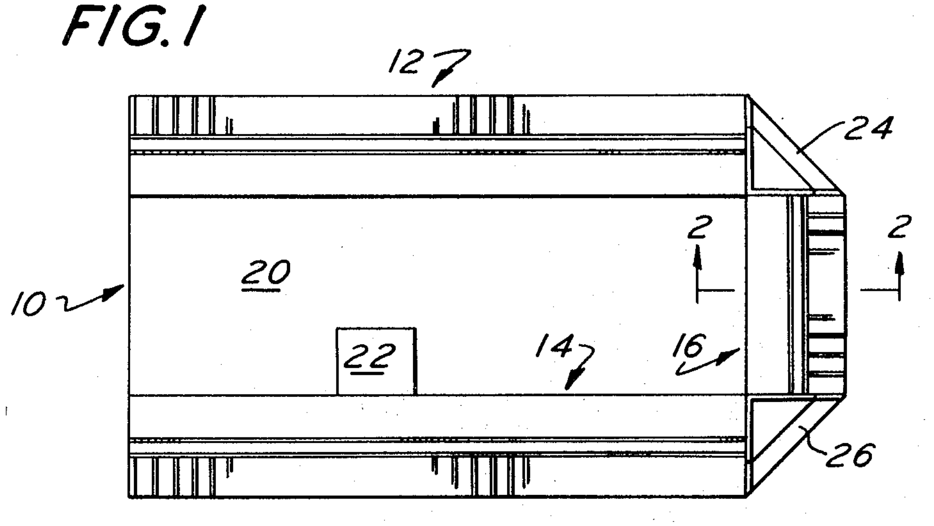
FIG. 1 is a top plan view of a tape cassette display fixture in accordance with the present invention.

Referring to the drawing in detail, wherein like numerals indicate like elements, there is shown in FIG. 1 a tape cassette display fixture designated generally as 10. The fixture 10 for purposes of illustration of the present invention is generally U-shaped with sides 12 and 14 connected to an end 16. The fixture 10 is mounted on a floor 18 and within its confines is preferably provided with a raised platform 20.

The fixture 10 is generally attended by a salesperson standing on the platform 20 with sales being facilitated by means of a mobile cash register 22 which may roll on castors or ride on a track. The end 16 of the fixture 10 is interconnected with the sides 12 and 14 by means of triangular display areas 24 and 26 which may be utilized to exhibit notices with respect to recently acquired tape cassettes in stock, notices of availability, notices with respect to sales of particular types of cassettes, etc. Each of the sides and ends of the fixture are identical. Accordingly, only the structural interrelationship of end 16 will be described in detail.

Figures 2, 3:
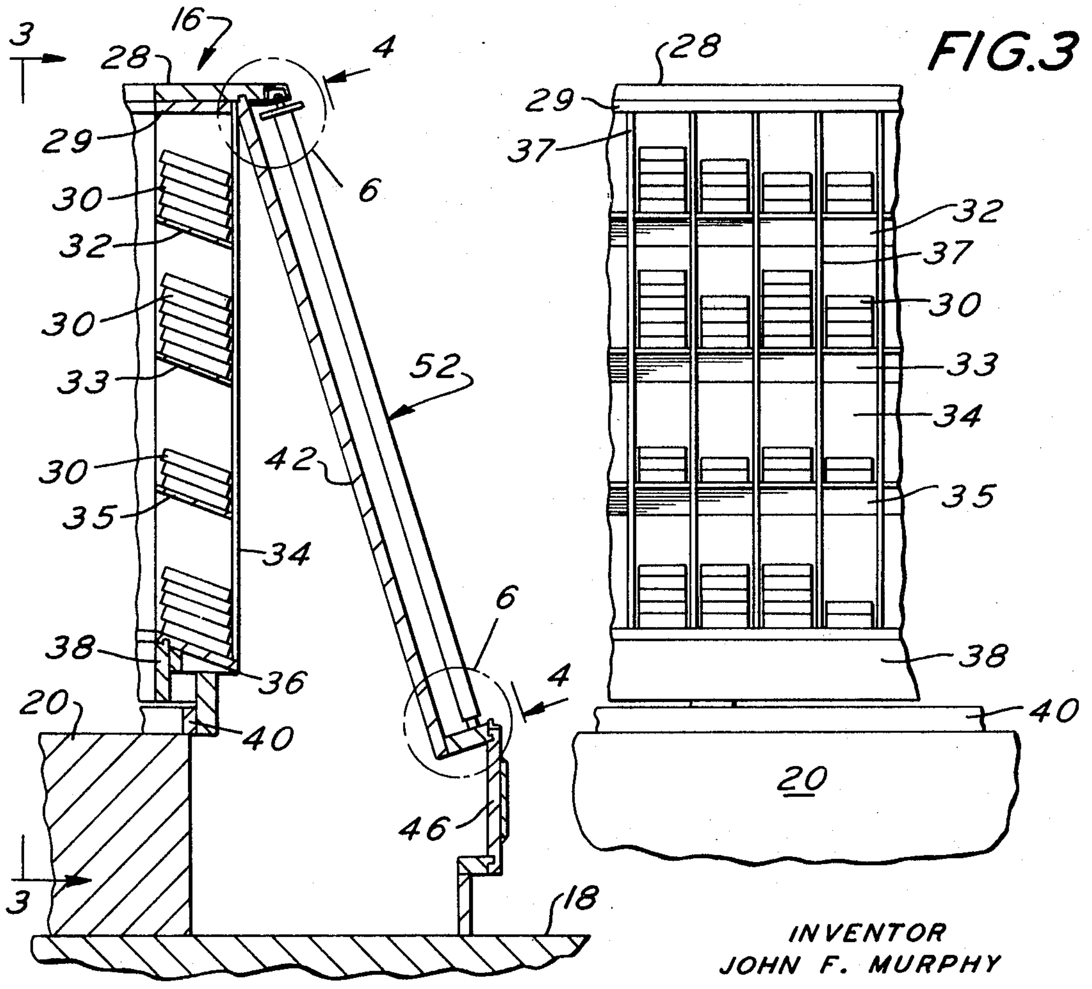
FIG. 2 is a sectional view taken along the line 2—2 in FIG. 1 but on an enlarged scale.
FIG. 3 is a view taken along the line 3—3 in FIG. 2.

As shown more clearly in FIGS. 2 and 3, the end 16 includes a counter 28. On the side of the counter 28 accessible to the salesperson attending the fixture 10, there is provided a storage area for cassettes 30 orientated with respect to the cassettes displayed on the customer's side of the fixture immediately adjacent thereto. The cassettes 30 are stored on shelves 32, 33, 35, etc., vertically arranged and separated by vertically disposed partitions 37. The shelves 32, 33, 35, etc., are connected to a vertically disposed backboard 34 provided with a top wall 29 and a bottom wall 36. The thusly constructed shelf is mounted on a runner 38 supported from the platform 20 by a recessed kickboard 40. The raised platform 20 facilitates observation of the cassettes on the customer's side of the fixture by the salesperson.

As shown more clearly in FIGS. 2 and 6, an inclined wall 42 is provided at an angle of approximately 70°–75° with respect to the horizontal. The upper end of wall 42 is connected to the counter 28 on the bottom surface thereof. The lower end of wall 42 is connected to a base 44 which is perpendicular thereto. Base 44 lies in a plane approximately 15°–20° with respect to the horizontal. Base 44 is connected at its rear end to the wall 42 and its forward end is connected to and supported by a support means 46 which rests on the floor 18.

The cassettes 30 are displayed in parallel cassette housings 48, 50, 52, etc. The cassette housings are inclined rearwardly away from the customer so as to be parallel to the wall 42. Each of the cassette housings is identical. Accordingly, only cassette housing 52 will be described in detail.

Figures 4, 5:
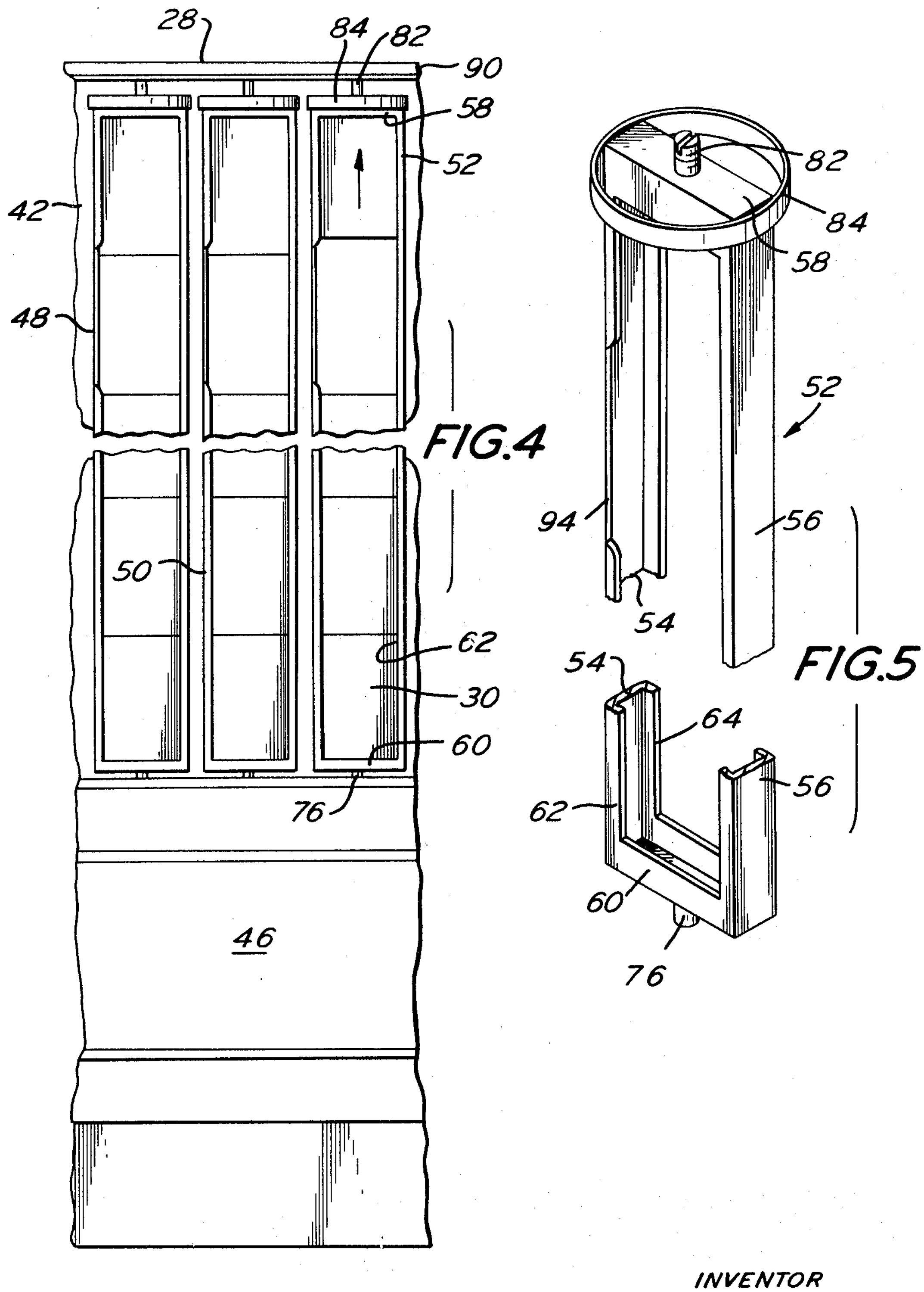
FIG. 4 is a view taken along the line 4—4 in FIG. 2, but on an enlarged scale.
FIG. 5 is a perspective view of a tape cassette display housing.

Referring to FIG. 5, it will be seen that the cassette housing 52 is an elongated structure adapted to receive a plurality of cassettes end to end. The cassette housing 52 includes sides 54 and 56, top portion 58 and bottom portion 60, all of which are channel-shaped so as to define openings 62 and 64 in side faces thereof. The openings 62 and 64 are of the same size except as will be made clear hereinafter.

Referring to FIGS. 6–8, it will be noted that the top surface of base 44 is provided with an elongated slot 66 running the length thereof. For each of the cassette housings, there is provided a mounting plate 68 which extends transversely across the slot 66 and is removably secured to the base 44. The plate 68 is provided with an aperture therein overlying the slot 66 and containing a journal 70 which is fixedly secured to the plate. The journal 70 is provided with generally V-shaped cam surfaces 72 and 74 on opposite sides thereof.

The bottom portion 60 of the cassette housing 52 is provided with a downwardly extending pivot pin 76. The pivot pin 76 extends into the journal 70 and is rotatably supported thereby. Pin 76 is provided with a transverse hole receiving a cam follower 78. The cam follower 78 in an operative disposition is disposed between the cam surfaces 72 and 74. In this manner, the face of the cassette housing 52 containing the opening 62 will be facing the customer. See FIG. 4.

A nut 80 is fixedly secured to the inner surface of the top portion 58 of the cassette housing 52. A threaded member 82 extends through a hole in the top portion 58 and is threadedly coupled to the nut 80. The upper end of member 82 is provided with a screwdriver slot or other configuration which is operable by means of a tool to rotate member 82.

A ring 84 is fixedly secured to the top portion 58 of the cassette housing 52. Ring 84 facilitates manual rotation of the housing 52 from a position wherein opening 62 is exposed to the customer to a position where opening 64 is exposed to a customer. That is, the housing 52 is mounted for rotation through 180°. The cam follower 78 cooperating with the cam surfaces 72 and 74 prevents the housing 52 from being stopped and remaining in any position between 0° and 180°. Thus, the housing 52 will always assume one of two positions, 180° apart for exposing to a potential customer one of two sides of the cassettes mounted within the housing 52. As the housing 52 rotates, it reciprocates along the axis of member 82 for a distance corresponding to the height of surfaces 72 and 74.

A plate 86 is fixedly secured to the bottom surface of the counter 28 and extends along the length thereof. Plate 86 has an angled portion 88 lying in a plane parallel to the plane of base 44 and projecting beyond the end face of the counter 28. Angle portion 88 has holes therein at spaced points therealong to as to receive the threaded member 82 on each of the cassette housings. The holes in portion 88 are larger than the diameter of the threaded members 82 so as to have a loose fit. A cover 90 is connected to the counter 88 by hinge 92 and cooperates with the angled portion 88 to enclose the upper ends of the threaded members 82 of the cassette housings. Any fastener or lock means may be utilized to prevent unauthorized manipulation of the cover 90.

The transverse distance across the openings 62 and 64 is slightly smaller than the width of the cassette. As shown more clearly in FIG. 5, one of the flanges defining opening 62 is interrupted so as to provide a gap 94.

The gap 94 is slightly longer than the length of the tape cassette. As shown more clearly in FIG. 4, pilferage of cassettes from the housings 48 and 50 is prevented by the fact that the two uppermost tape cassettes extend partially into the gap 94. In order to remove one of the cassettes from the housings 48 and 50, it is necessary to move the uppermost cassette upwardly so that the second cassette is aligned with the gap 94. Movement of the uppermost cassette is prevented by the threaded member 82 which engages the end face of the uppermost cassette. In order to rotate the threaded member 82 in order to be able to move the uppermost cassette upwardly, it is necessary to manipulate the cover 90 upwardly and rotate the threaded member 82 by means of a tool.

Cassettes are fed into the housings 48–52 in the following manner. Cassettes are positioned so as to overlie the gap 94 and permitted to drop downwardly. When cassettes have been introduced into the housing 52 so that the uppermost cassette is just below the gap 94 in housing 52 as shown in FIG. 4, the next cassette introduced through the gap 94 will be moved upwardly so as to be above the gap. The threaded member 82 will have been rotated so that it moves out of the space into which the cassettes will be introduced.

After the last cassette is introduced through the gap 94, the topmost cassette will be permitted to drop so that its lower end is below the upper edge of the gap 94. Thereafter, the threaded member 82 will be manipulated so as to be threaded downwardly. Thereafter, the cover 90 may be latched, locked, or otherwise interconnected with the plate 86 or some other support structure so as to prevent unauthorized manipulation. Since the cassettes cannot move upwardly or downwardly within the housing 52, it is not possible to align any of the cassettes with the gap 94 for removal without first manipulating the threaded member 82.

The cassette housings attractively display the cassettes in a manner whereby opposite faces of the cassettes may be observed by a potential customer. The cassette housings are preferably grouped so that cassettes dealing with the same subject matter or type of song or rock group are together. The cassette housings are preferably made from a lightweight noncorrosive material which is decorative such as anodized aluminum, bronze plated steel, etc. The counter 28, wall 42, support means 46, etc., may be painted, laminated with a simulated wood material, may be paneled, etc., so as to provide an attractive display fixture.

Each of the cassette housings is aligned generally with the storage space defined by adjacent partitions 37 so that the salesperson would have immediately accessible to him cassettes corresponding to those displayed in any one of the cassette housings 48, 50, 52, etc. Thus, the stock supply is immediately adjacent the display and orientated therewith for ease and rapidity in service of customers.

While the fixture of the present invention is particularly designed for use in connection with tape cassettes, it will be appreciated by those skilled in the art that the fixture may be utilized for display of other objects which have the same merchandising problems as tape cassettes.

The present invention may be embodied in other specific forms without departing from the spirit or essential attributes thereof and, accordingly, reference should be made to the appended claims, rather than to the foregoing specification as indicating the scope of the invention.

I claim:

1. A fixture display comprising a plurality of upright housings rotatably supported about an inclined axis, the major faces of said housings having an opening through which objects in the housings are visible, said housings having an aperture means through which objects may be introduced into the housings, means on each housing for changing the effective length of the space for retaining objects therein so that objects may not be withdrawn from the aperture means without moving said last-mentioned means.

2. A display fixture in accordance with claim 1 wherein said aperture means is a gap in a peripheral flange on each housing.

3. A display fixture in accordance with claim 1 wherein said last-mentioned means is a threaded member at the upper end of each housing.

4. A display fixture in accordance with claim 3 wherein each housing is rotatable about an axis corresponding to the longitudinal axis of its threaded member.

5. A display fixture in accordance with claim 1 including a counter top, a storage shelf below the level of the counter top, a wall between said shelf and said housings, and partitions dividing the shelf and said housings, and partitions dividing the shelf into zones corresponding generally to the location of the housings.

6. A display fixture in accordance with claim 5 wherein said wall is inclined so as to be generally parallel to the axis of rotation of said housings, the lower end of said wall being provided with a base, said base rotatably receiving the bottom end of each housing.

7. A display fixture in accordance with claim 1 including a counter top, means associated with the counter top for rotatably supporting the upper end of each housing, said last-mentioned means including an enclosed space for receiving a threaded member on each housing and providing access to the upper end of the threaded member.

8. A display fixture comprising a counter top, a shelf below the counter top, the shelf being provided with upright partitions, a plurality of generally parallel upright housings rotatably supported, each housing being generally aligned with respect to a pair of partitions, a wall between said shelf and said housings, the major faces of said housings having openings through which the contents of the housings are visible; said housing having aperture means through which objects may be introduced into the housings, and means on each housing for changing the effective length of the space for retaining objects therein so that objects may not be withdrawn from the aperture means without moving said last-mentioned means.

9. A display fixture in accordance with claim 8 wherein said housings are rotatable about an inclined axis, said wall being generally parallel to said axis, and means for maintaining the housings in one of two positions wherein one of the aperture means is in a plane generally parallel to said wall.

10. A display fixture in accordance with claim 8 wherein the means for changing the effective length of the space within the housings includes a threaded member at the upper end of the housings, each threaded member being rotatably supported by a plate connected to said counter top, and means for preventing unauthorized access to the upper end of the threaded members.

11. A fixture in accordance with claim 8 including a ring on each housing to facilitate rotation of each housing.

12. A display fixture in accordance with claim 8 wherein the housings are rotatably supported by a base, said base having a slot therein, each housing having a pin extending into the slot, means associated with each base to prevent the pin at the lower end of the housings from moving along the length of the slot, and means associated with each pin to maintain the housings in one of two predetermined dispositions.

* * * * *